Patented Aug. 7, 1923.

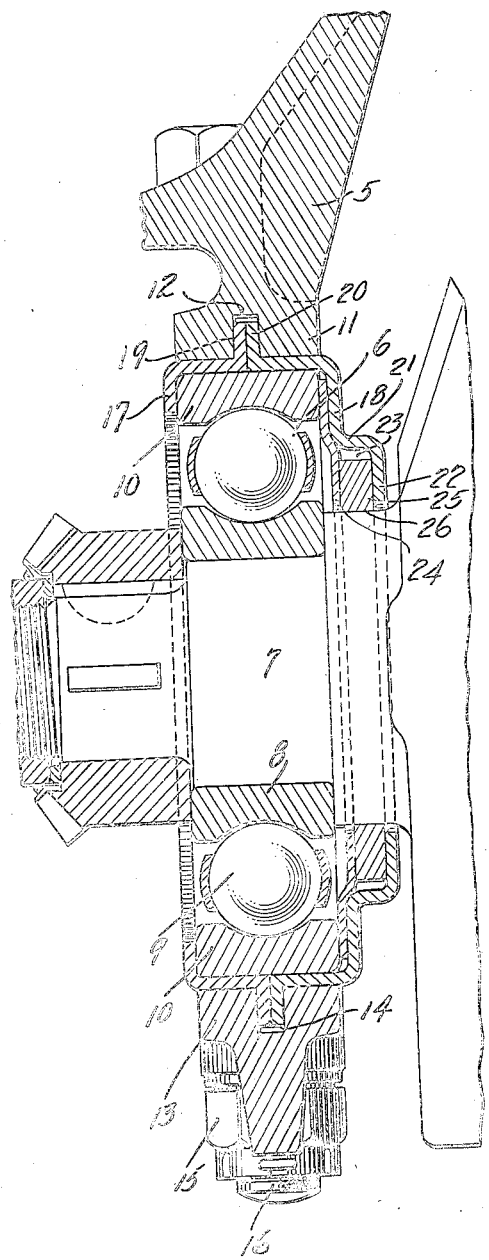

1,464,393

UNITED STATES PATENT OFFICE.

VICTOR W. PAGÉ, OF KEW GARDENS, NEW YORK, N. Y.

BEARING CONSTRUCTION.

Application filed November 7, 1921, Serial No. 513,538. Renewed June 8, 1923.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Bearing Construction, of which the following is a full, clear, and exact description.

The present invention relates to new and useful improvements in bearings, and it pertains more particularly to means for centering and retaining a bearing in operative position.

It is one of the objects of the invention to provide new and improved means for centering bearings and particularly the main bearings of internal combustion motors.

It is a further object of the invention to provide centering means which serves also to retain the bearing in position after the same has been centered.

It is a further object of the invention to combine with the bearing centering and retaining means, means for positioning a felt washer which serves as a packing for the bearing.

It is a still further object of the invention to provide a device of this character which may be readily assembled and disassembled, and which when the several parts are in position the bearing will be automatically centered and retained in centered position.

With the above and other objects in view, reference is had to the accompanying drawings, in which the figure is a sectional view of the main bearing of an internal combustion motor, said bearing being constructed in accordance with the present invention.

Referring more specifically to the drawings, the reference character 5 designates the base portion of a block of cylinders, the complete construction thereof not being shown, and 6 designates one of the main bearings of a motor. For the sake of illustration, the front main bearing is the one shown. The reference character 7 designates the forward portion of the crank shaft, and surrounding said portion 7 of the crank is a member 8, which serves as the inner race of the bearing 6. Mounted upon this inner race is a circular series of anti- friction elements 9 and retaining these antifriction elements in engagement with the inner race 8, is an outer race 10.

The base portion 5 of the engine block is provided with a bearing portion 11, and said bearing portion 11 is semi-circular in form and is provided with a continuous groove, co-acting with the semi-circular bearing portion 11, is a semi-circular cap 13, and said cap is likewise provided with a groove 14 adapted to register with the groove 12 in the base portion of the block when the cap 13 is placed in position. This cap 13 is maintained in position by means of nuts 15 engaging bolts 16 arranged on opposite sides of the bearing.

Enclosing the bearing assembly is a housing and said housing comprises an outer member 17 and an inner member 18. The outer member 17 has a flange 19 formed thereon and the inner member 18 has a similar flange 20, said flanges 19 and 20 adapted to be received within the grooves 12 and 14 of the block base and cap, respectively. The member 18 is formed with an offset portion 21 and a depending portion 22 adapted to extend into proximity with the crank shaft 7, the offset portion forming a space 23.

Projecting inwardly from the outer race member 10, is a plate 24, and mounted in the space between the depending portion 22 and the plate 24, is a felt or similar washer 25, which engages the crank shaft, as indicated by the reference character 26, to form an oil-tight joint between the crank shaft and the bearing 6.

The device is assembled as follows:

The bearing 6 is placed about the forward portion of the crank shaft 7, after which the members 17, 18 and 24 are positioned with the felt washer 25 between the members 18 and 24. The flanges 19 and 20 of the members 17 and 18 are positioned in the groove formed in the base portion of the cylinder block. After this has been done, the cap 13 is positioned with the flanges 19 and 20 in the groove 14 thereof, and the nuts 15 are placed upon the bolts 16 and tightened. As these nuts are tightened, the cap 13 serves to position the bearing 6, and owing to the fact that the flanges 19 and 20 of the members 17 and 18 are received in the grooves 12 and 14 of the base portion 5 of the block and the cap 13, respectively, the bearing will be automatically centered and the felt washer packing will be retained in proper operative position.

When it is desired to disassemble the bearing, it is only necessary to loosen the nuts 15 and remove the cap 13. This permits of a falling of the crank shaft, it being understood, of course, that this is done at all the main bearings and permits of the flanges 19 and 20 dropping out of the groove 12, which action permits of the removal of the members 17 and 18 and a complete disassembling of the bearing.

From the foregoing it is apparent that the present construction provides a new and improved bearing which may be readily assembled and disassembled, and which when in its assembled position will at all times be retained in true centered position, and be adapted to resist end thrust as well as a radially applied load or any resultant of these component loads.

I claim—

1. A bearing construction comprising a bearing support provided with a groove, a bearing, a housing therefor, means carried by the housing and adapted for engagement with the groove to center the bearing, and means carried by the housing for positioning a suitable packing relative to the bearing, said packing-positioning means being formed integral with the housing.

2. In a bearing, a bearing support, an anti-friction bearing carried by the support, a housing for said anti-friction bearing, said housing having a continuous offset flange, a plate interposed between said housing and the bearing, and a packing carried in the space between said offset portion of the housing and said plate, substantially as described.

VICTOR W. PAGÉ.